United States Patent [19]
Cordsen

[11] Patent Number: 5,402,391
[45] Date of Patent: Mar. 28, 1995

[54] ARRANGEMENT OF SOURCE AND RECEIVER LINES FOR THREE-DIMENSIONAL SEISMIC DATA ACQUISITION

[75] Inventor: Andreas Cordsen, Calgary, Canada

[73] Assignee: Geophysical Exploration & Development Corp., Alberta, Canada

[21] Appl. No.: 134,173

[22] Filed: Oct. 8, 1993

[51] Int. Cl.[6] .............................................. G01V 1/20
[52] U.S. Cl. ..................................................... 367/56
[58] Field of Search ................ 367/56, 58, 38, 59, 367/72

[56] References Cited

U.S. PATENT DOCUMENTS

| | | | |
|---|---|---|---|
| 2,329,721 | 9/1943 | Hoover, Jr. et al. | 367/56 |
| 3,746,122 | 7/1973 | Davis | 367/56 |
| 3,793,620 | 2/1974 | Miller | 367/56 |
| 4,001,770 | 1/1977 | Hofer | 367/56 |
| 4,476,552 | 10/1984 | Waters et al. | 367/56 |
| 4,677,598 | 6/1987 | Johnson | 367/56 |
| 4,758,998 | 7/1988 | Johnson et al. | 367/58 |
| 4,933,912 | 6/1990 | Gallagher | 367/56 |
| 5,029,145 | 7/1991 | Marsden et al. | 367/56 |

FOREIGN PATENT DOCUMENTS

| | | |
|---|---|---|
| 989059 | 5/1976 | Canada . |
| 2042809 | 11/1980 | Germany . |
| 1233-065-A | 5/1986 | U.S.S.R. . |

*Primary Examiner*—Ian J. Lobo
*Attorney, Agent, or Firm*—Sheridan Ross & McIntosh

[57] ABSTRACT

The invention involves providing a plurality of substantially parallel and equally spaced source lines, each of which are formed by a plurality of equally spaced seismic energy sources. A plurality of substantially parallel and equally spaced receiver lines are also provided, each formed by a plurality of equally spaced seismic energy receivers. The source and receiver lines are overlaid in a transverse crossing manner, forming a rectangular grid, so that a source and a receiver are only substantially coincident every second or greater number of crossings. For each seismic disturbance, an array of common mid-point seismic reflections ("CMP's") is produced. Each CMP forms the center of one of multiple sub-bins which together form a standard bin. Stated otherwise, by slightly varying the source, receiver and line intervals so that receiver and source coincidence occurs, but only at every second or greater crossing, the number of CMP's per bin has been multiplied. During processing of the seismic survey results, adjacent sub-bins can be incrementally combined or trimmed to adjust the standard bin to a larger or smaller size, thereby permitting an explorationist to optimize between increased fold or more detailed resolution respectively.

2 Claims, 9 Drawing Sheets

Fig. 6a. *Prior Art*

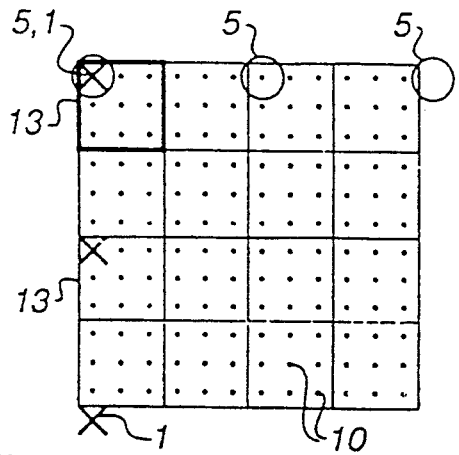
Fig. 9.
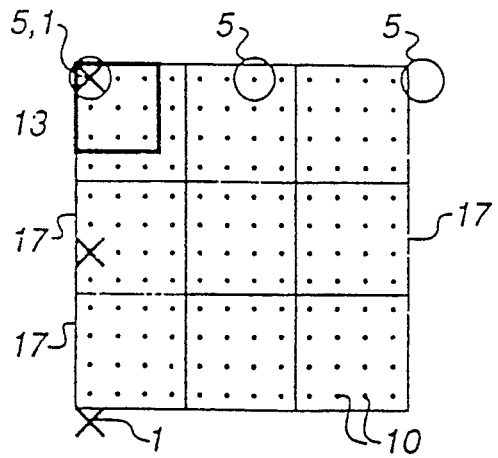
Fig. 10.
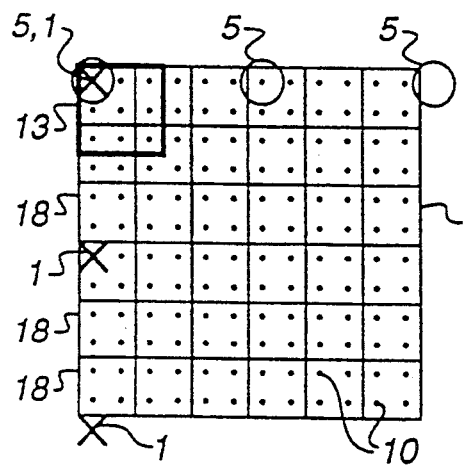
Fig. 11.
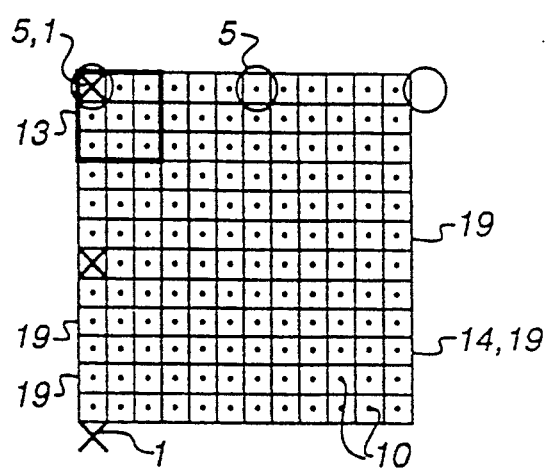
Fig. 12.
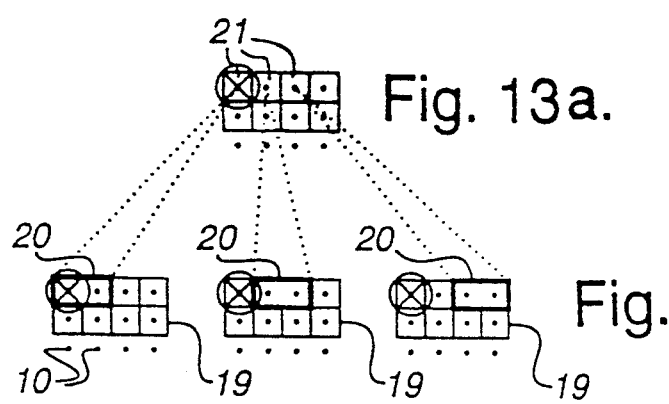
Fig. 13a.
Fig. 13b.

ARRANGEMENT OF SOURCE AND RECEIVER LINES FOR THREE-DIMENSIONAL SEISMIC DATA ACQUISITION

FIELD OF THE INVENTION

The invention relates to an improved arrangement of seismic energy sources and receivers for producing multiple common mid-points per standard bin in the process of acquiring three-dimensional seismic information. The arrangement involves varying the source, receiver and line intervals in an ordered manner.

BACKGROUND OF THE INVENTION

Commonly, three-dimensional ("3-D") seismic data acquisition involves arranging lines of seismic energy sources and receivers to form a rectangular grid. Each of the sources is activated to create a "seismic disturbance" —for example, an explosive charge may be detonated. The disturbance creates a wave or ray that penetrates down into the layered strata of the earth. The wave contacts a sub-surface acoustic impedance boundary or layer and is reflected back to the surface, to be detected by a patch of active receivers. Instrumentation, associated with the sources and receivers, converts reflected waves to signals which are recorded as data for post-acquisition processing and interpretation. The timing and amplitude of the signals are instructive of sub-surface characteristics and features.

For a sub-surface layer with no dip and parallel with the seismic array, a wave reflects at a reflection point which lies directly beneath a geometric mid-point between a source and a receiver.

As stated, a plurality of sources and receivers are arranged in intersecting lines to form a grid and provide, in a first instance, a plurality of reflection points well distributed over the surface area of interest, and in a second instance, to provide multiple points of reflection which occur at a common mid-point ("CMP"). This technique of providing multiple reflections at a CMP is known as "stacking". Stacking results in an increase in the signal-to-noise ratio (S/N), improving the data. The number of multiple reflections at a CMP is known as the number of "fold".

Generally, a surface area to be surveyed is divided into small discrete rectangular areas known as "bins". The size of the bins is dependent upon the anticipated resolution required.

The prior art discloses a variety of seismic arrangements having a goal to obtain the greatest number of fold and the greatest number of CMP's, using the least number of sources and receivers.

Typically, the sources and receivers are equally spaced, along their respective lines, to lie at the midpoint of every second bin along that respective line. When the survey is performed, a common mid-point is produced at the center of each bin.

U.S. Pat. 4,476,552 issued to Waters discloses a source and receiver arrangement that is typical of the arrangements commonly used. More particularly, Waters discloses:
providing a plurality of equally-spaced seismic sources along a source line;
providing a plurality of equally-spaced seismic receivers along a receiver line, said receiver spacing usually being the same as the source spacing; placing a plurality of the source lines in an equally spaced and parallel fashion, the spacing or interval of the source lines being an even multiple of the receiver spacing; placing a plurality of the receiver lines in an equally spaced and parallel fashion, the spacing of the receiver lines being an even multiple of the source spacing; overlaying or "gridding" the source and receiver lines at right angles, so that a receiver and a source are coincident at each crossing; and producing multiple reflections at CMP's by creating a seismic disturbance at each source and detecting the disturbance at the receivers.

Noise is extraneous seismic interference which tends to mask actual sub-surface features identified by the reflected wave signals. Noise can make the data unusable. Typically, noise is compensated for by increasing the fold, thereby increasing the signal-to-noise ratio.

Unfortunately, compensation for noise is accompanied by several disadvantages.

With conventional seismic arrangements, an increase in fold can be accomplished by increasing the number of sources and receivers used in the grid. The associated increase in required equipment is expensive and requires anticipation of the expected significance of noise, before the survey is conducted. Further, there is no guarantee that the decisions made about the anticipated required fold are correct. Ultimately, an explorationist takes a risk and assumes a trade-off between economics and the quality of the data.

Should the noise be found to be worse than had been anticipated, a processing option is used to forestall discarding the data. The fold can be mathematically increased by combining adjacent, whole bins together. The bin size can be doubled in one dimension or quadrupled in two dimensions, thereby multiplying the data available in the new larger bin (higher fold).

The larger bin, and the associated increase in signal-to-noise ratio, is achieved only at the expense of a significantly poorer resolution (larger area), potentially obscuring sub-surface features of interest. The prior art has no processing options which would permit increasing the fold moderately to some intermediate value, perhaps just rendering the data usable, without the risk of going so far as to grossly diminish the resolution.

It is therefore an object of the present invention to provide a 3-D acquisition method which can reduce the risks for decisions made before the survey is conducted and further provide greater processing flexibility, to optimize the signal-to-noise ratio with resolution.

SUMMARY OF THE INVENTION

In accordance with the present invention, a novel arrangement of seismic energy sources and receivers is provided.

In common with the prior art, a plurality of sources are equally spaced along a source line. A plurality of receivers are similarly spaced equally along a receiver line. A plurality of the receiver lines are arranged in equally spaced apart and parallel fashion. A plurality of the source lines are arranged in equally spaced apart and parallel fashion. The source lines are overlaid perpendicularly with the receiver lines so that the lines cross and form a rectangular grid on the earth's surface.

Now, as previously stated, in the prior art one usually designs the source, receiver and line spacings or intervals in accordance with the following:
the receiver line spacing is a multiple of the source spacing (that is, the ratio of the receiver line spacing to the source spacing yields a remainder of zero);

the source line spacing is a multiple of the receiver spacing; and the spacings are such so that, at every intersection of the source and receiver lines, the source and receiver are coincident (see FIG. 5a).

This arrangement results in theoretical placement of all CMP's at the center of each bin. Similarly, by offsetting the plurality of receiver and source lines one bin width, identical results are obtained, with theoretical placement of all CMP's at the center of each bin.

In accordance with this invention, however, the source, receiver and line spacings are selected so that only every second to tenth intersection of the source and receiver lines involves substantially coincident alignment of a source and receiver. This is achieved by varying the receiver and source line intervals slightly from the even multiple rule of the prior art. Stated alternatively, the source, receiver and line spacings are such that some of the receiver lines cross the source lines at points between adjacent sources, so there is no coincidence of source and receiver at those crossings. Also, some of the source lines cross the receiver lines at points between adjacent receivers, so there is no coincidence of source and receiver at those crossings. In summary, the design of the new grid involves observing the following rules: the ratio between the receiver line spacing and the source spacing yields a remainder greater than zero; the ratio between the source line spacing and the receiver spacing yields a remainder greater than zero; there is substantial coincidence of source and receiver at crossings of source and receiver lines in a grid, but only at every second, third, fourth . . . tenth source line and only at every second, third, fourth . . . tenth receiver line (see FIG. 7);

so that there results a plurality of spaced apart CMP's distributed in each bin.

Preferably, the substantial coincidence occurs near intersections of every second, third, fourth or fifth source line and near intersections of every second, third, fourth or fifth receiver line and the following formulae are satisfied in the design of the grid:

$RLI = SI (n \pm 1/S_s)$
$SLI = RI (m \pm 1/S_R)$ where:
RLI = receiver line interval (or spacing),
SLI = source line interval,
RI = receiver interval,
SI = source interval,
$S_R$ = number of sub-bins in the receiver line direction,
$S_s$ = number of sub-bins in the source line direction, and
n,m = integers.

Typically, one will use values of $S_r$ and $S_s$ of 2 to 5, providing a range of bin and grid sizes to suit individual seismic applications. The receiver and source line spacings are understood to represent averages over the grid, recognizing that obstacles on the earth's surface can force occasional variation in the spacing and the alignment of adjacent lines.

In the case where substantial coincidence occurs every second line in both directions, the CMP density is increased to four CMP's per bin. In the case where substantial coincidence occurs every third line, the CMP density is increased to nine CMP's per bin.

Now, one can increase the number of reflection points to any number by the practice of this design. However, to be practical the number which can be implemented, is limited by the fold, the offset to the farthest receivers from a source, and the number of channels employed. If the number of theoretical reflection points/bin is higher than the actual fold, there will be "holes" in the otherwise even distribution of reflection points within each bin. As a practical matter, one will limit the number of reflection points per bin to such a value that several of the individual CMP's will have more than one fold.

The novel method involves post-acquisition re-binning of the CMP's. This enables either increasing the fold in larger bins or decreasing the fold in smaller bins.

Broadly stated, the invention comprises an improved method of three-dimensional seismic acquisition with respect to sub-surface layers in the earth, comprising: (a) providing a plurality of equally spaced seismic energy sources in a linear array to form a source line; (b) providing a plurality of equally spaced seismic energy receivers in a linear array to form a receiver line; (c) repeating steps (a) and (b) to form a grid having the source lines substantially equally spaced and parallel and the receiver lines also substantially equally spaced and parallel with the source lines intersecting the receiver lines in a rectangular grid pattern, said pattern having a ratio of the spacing between the receiver lines and the spacing between the sources which yields a remainder greater than zero and a ratio of the spacing between the source lines and the spacing between the receivers which also yields a remainder greater than zero, said line, receiver and source spacings being selected so that some of the sources and receivers are substantially coincident but only at every second to tenth intersection of the source and receiver lines; and (d) initiating seismic disturbances from the sources and reflecting seismic energy from sub-surface layers and receiving said seismic reflections at the receivers.

BRIEF DESCRIPTION OF THE DRAWINGS

FIG. 6 is a series of sub-FIGS. 6a through 6f, each of which depicts one source line crossing three receiver lines-in the aggregate, the sub-figures show the relative increase in production of CMP's within a standard bin, as a result of varying the frequency of coincident crossings of receiver lines and source lines;

FIG. 6a illustrates the prior art case in which the source, receiver and line intervals are adapted to ensure that every crossing of a receiver line results in a receiver being coincident with a source—there is only 1 CMP per standard bin;

FIG. 7b is a sampling of 9-CMP standard bins arranged in 1/66 section of the patch according to FIG. 7a;

FIG. 9 illustrates the 24×24 m 9-CMP standard bins of Example I;

FIG. 10 illustrates re-sizing the 9-CMP standard bins of FIG. 9 into 16 -CMP, 32×32 m bins;

FIG. 11 illustrates re-sizing the 9-CMP standard bins of FIG. 9 into 4-CMP, 16×16 m bins;

FIG. 12 illustrates re-sizing the 9-CMP standard bins of FIG. 9 into 1-CMP, 8×8 m bins;

FIG. 13a illustrates a small sample of the 8×8 m bins of FIG. 12 to which a 1×2 sub-bin running averaging techniques is applied;

FIG. 13b illustrates three 2-bin averages of a 1×2 sub-bin running averaging technique applied to the 8×8 m bins of FIG. 13a;

DETAILED DESCRIPTION OF THE PREFERRED EMBODIMENT

Figure 1:
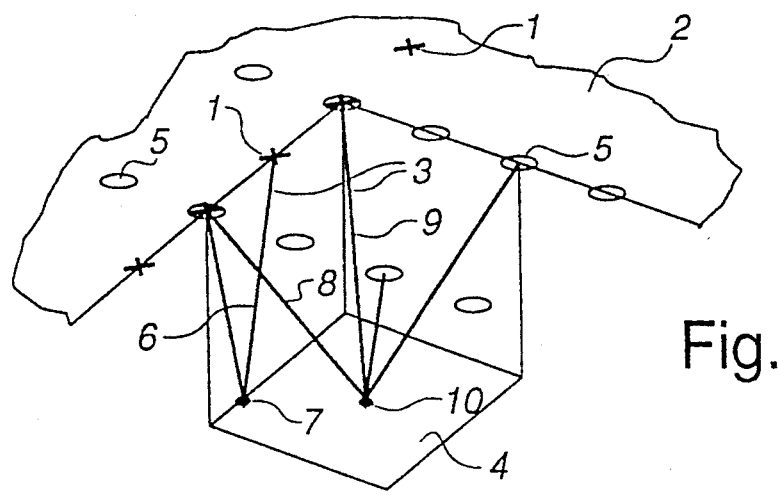
FIG. 1 is a perspective section view of a volume of the earth, showing reflections points with one and two fold.

As described previously, and as shown in FIG. 1, a seismic disturbance is created from seismic energy sources (depicted as X's) 1 located on the earth's surface 2. A seismic energy ray or wave 3 is seen to travel from the source 1, down into the earth to reflect from a sub-surface acoustic impedance boundary or layer 4. The energy wave 3 reflects back up to the surface 2 and is detected by seismic receivers 5 (depicted as circles). Equipment associated with the receivers 5 converts the received energy wave 3 into signals and thence into recorded data, representative of sub-surface features.

One energy wave 6, travelling from a source 1, reflects at a mid-point 7 between the source 1 and a receiver 5. This represents one fold. Two other energy waves 8 and 9 are shown travelling between two discrete reflecting pairs of sources 1 and receivers 5, each wave 8, 9 reflecting from the sub-surface layer 4 at a common midpoint ("CMP") 10. This represents two fold.

Figure 2:
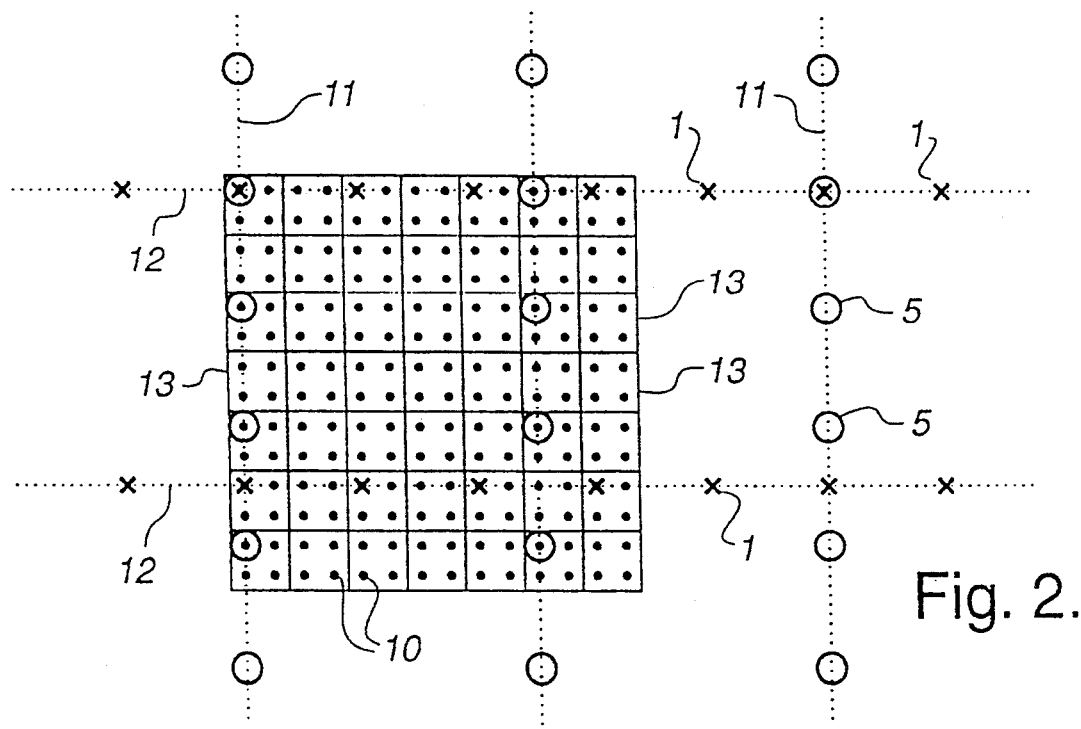
FIG. 2 is a partial plan view of one arrangement of the present invention, showing the particular arrangement of sources and receivers in lines, the crossing of said lines, standard bins and resulting CMP's.
Figure 3:
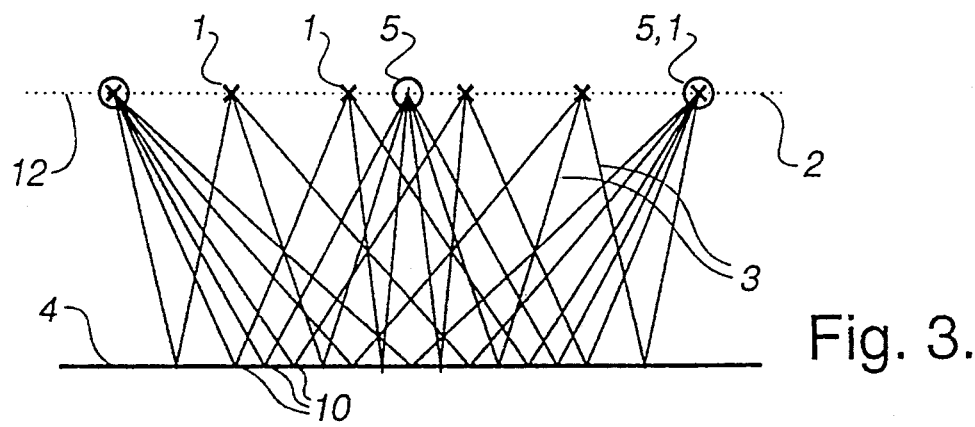
FIG. 3 is a vertical cross-sectional view fancifully depicting seismic energy rays and the resulting CMP's which result from one arrangement of the present invention.

Having reference to FIGS. 2 and 3, an arrangement of sources 1 and receivers 5, according to the present invention, is shown. A plurality of receiver lines 11 are placed on the earth's surface 2 in substantially equally spaced and parallel arrangement. Each line 11 is formed by a plurality of equally spaced receivers 5. A plurality of source lines 12 are placed on the surface 2 in substantially equally spaced and parallel arrangement. Each line 12 is formed by a plurality of equally spaced sources 1.

Figure 7A:
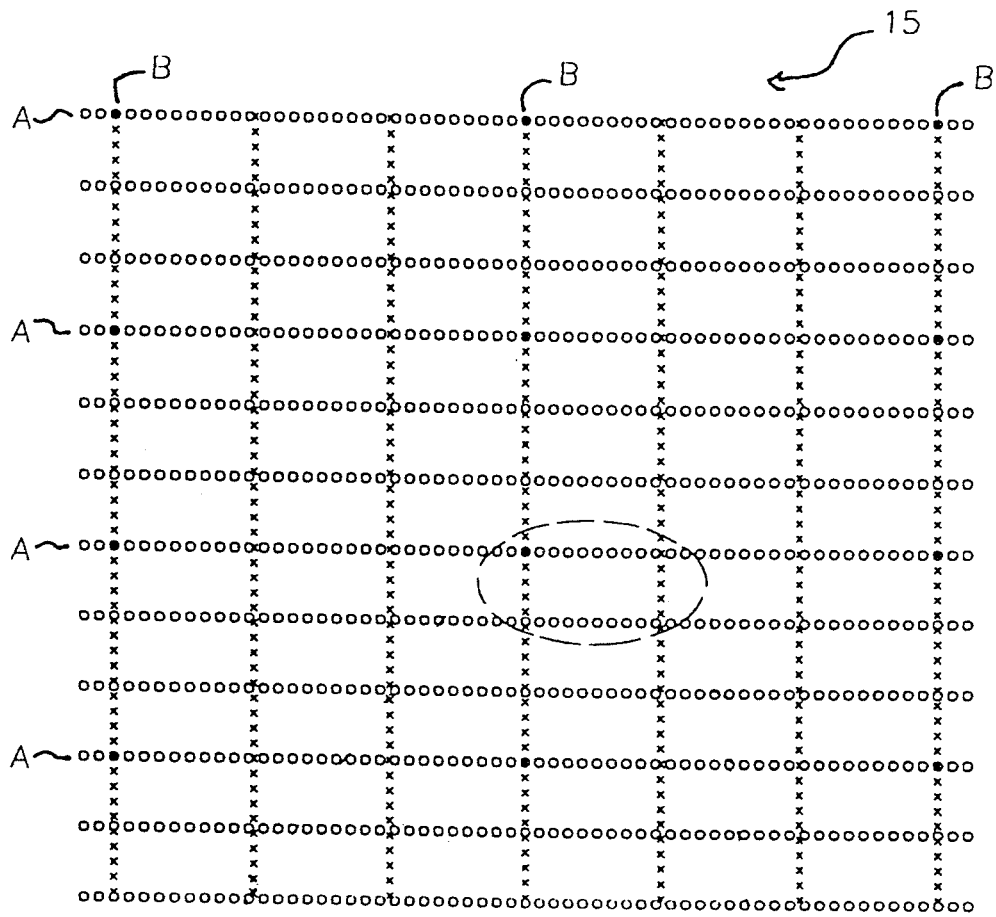
FIG. 7a is a plan view showing a patch used for Example I.

The source lines 12 and receiver lines 11 are laid out in the form of a rectangular grid, a portion of which forms a patch 15. A patch comprising 7 receiver lines is shown in FIG. 7a. The spacings between the lines 11, 12, receivers 5 and sources 1 are arrived at using the following rules:

(a) the ratio of the spacing between the receiver lines 11 and the spacing between the sources 1 yield a remainder greater than zero;

(b) the ratio of the spacing between the source lines 12 and the spacing between the receivers 5 yield a remainder greater than zero;

(c) The source line spacing SLI and the receiver line spacing RLI are established using the following formulae:

$$SLI = RI(m \pm 1/S_r) \qquad (1)$$

$$RLI = SI(n \pm 1/S_S) \qquad (2)$$

where:
RI is the receiver spacing,
SI is the source spacing,
$S_R$ is the desired number of sub-bins in the receiver line direction; and
$S_S$ is the desired number of sub-bins in the source line direction.

The values n and m are integers which affect the magnitude of the receiver and source line spacing, chosen according to the number of receiver channels available and the specified maximum desired size of the patch 15. Generally, a greater number of source and receiver lines 12, 11 than the desired number of sub-bin $S_R$, $S_s$ are required to ensure that no holes appear in a standard bin 13.

A typical grid design for the arrangement of FIGS. 2 and 3 would involve the following values:
RI = 60 m
SI = 60 m
$S_R = 2$
$S_s = 2$
SLI = 150 m
RLI = 150 m
RLI/SI = 2.5
SLI/RI = 2.5

A grid design using rules (a), (b) and (c) and the typical values given above yields the arrangement shown in FIGS. 2 and 3, wherein only every second crossing A of a receiver line 11 intersects a source line 12 so that a source 1 and receiver 5 are substantially coincident and only every second crossing B of a source line 12 intersects a receiver line 11 so that a receiver 5 and a source 1 are substantially coincident.

Seismic energy waves 3 are transmitted from the sources 1 and are detected at the receivers 5. An array of reflections at CMP's 10 are produced within standard bins 13. Each standard bin 13 has dimensions of ½ the source spacing by ½ the receiver spacing.

Since two reflection points are produced in each line direction, four theoretical CMP's 10 appear within each standard bin 13. Therefore, for the arrangement of FIGS. 2 and 3, the number of CMP's 10 which appear in each standard bin 13 is four, fourfold that of the prior art arrangement of FIGS. 5a and 5b.

Figure 4:
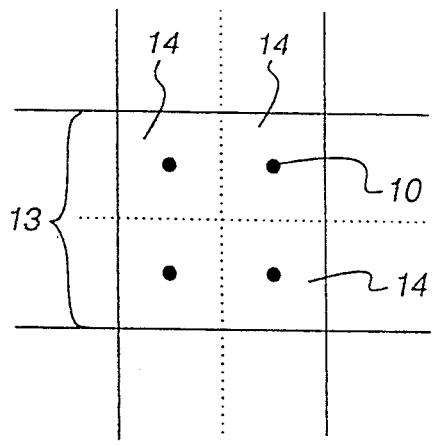
FIG. 4 is a plan view of a standard bin according sub-bin.

Having reference to FIG. 4, the discrete area surrounding each CMP 10 within a standard bin 13 is referred to as a sub-bin 14. Therefore a standard bin 13 which contains 4 CMP's 10 (FIG. 2) is comprised of 4 sub-bins 14.

Figure 5A:
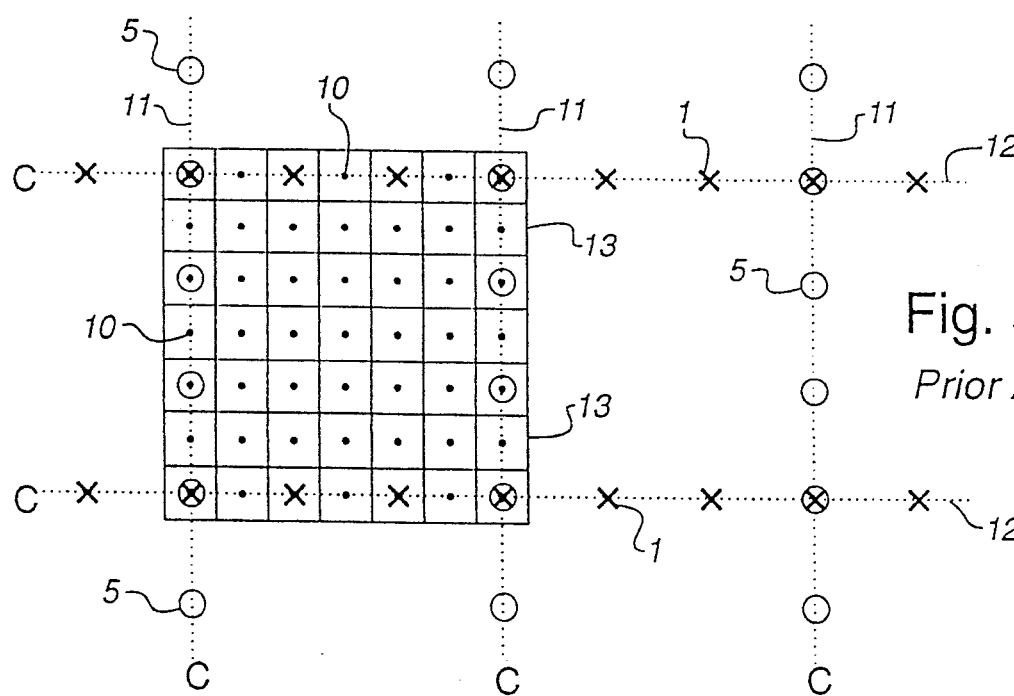
FIG. 5a is a partial plan view in accordance with the prior art showing the arrangement of sources and receivers in lines, standard bins and resulting CMP's.
Figure 5B:
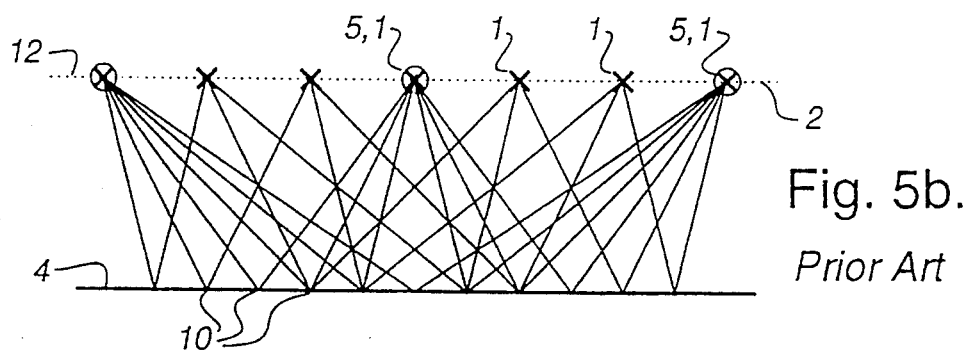
FIG. 5b is a vertical cross-sectional view fancifully depicting seismic energy rays and CMP's for an arrangement in accordance with the prior art.

As shown in FIGS. 5a and 5b, source lines 12 in the prior art arrangement are provided perpendicular to receiver lines 11 and are overlaid thereon in a regular and coincident manner at each crossing C. When seismic disturbances are created as described previously, CMP's 10 are produced in an array aligned only with the sources 1, the receivers 5, and at array points midway therebetween. Therefore, each standard bin 13 associated with the prior art contains only one CMP 10, located at its center.

The method of the invention achieves a similar fold as the prior art by specifying one lines' 11 or 12 spacing slightly larger and the other transverse lines' 12 or 11 spacing as slightly smaller than that used in the prior art arrangement.

Referring to FIGS. 6a through 6e, a single source line 12 is shown in areal view, showing alternate arrangements for crossings of the receiver lines 11 and the result upon the number of CMP's 10 produced per standard bin 13.

FIG. 6a again presents the prior art case in which every crossing of the receiver line 11 results in a source 1 coinciding with a receiver 5. Only one CMP 10 per standard bin 13 results.

Figure 6B:
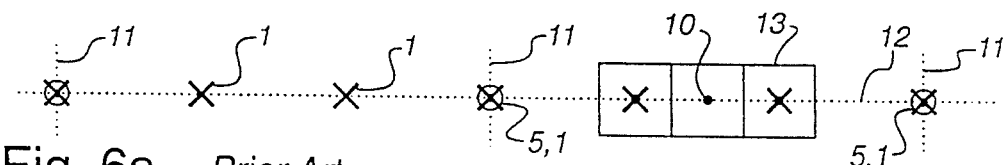
FIG. 6b illustrates the method of the invention in the case where only every second receiver line has a receiver coincident with a source, thereby creating 4 CMP's per standard bin.
Figure 6B:
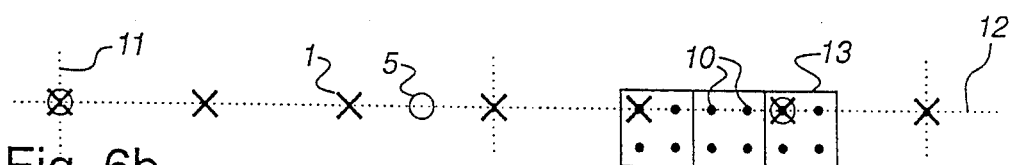

FIG. 6b presents the arrangement according to FIGS. 2 and 3, in which only every second crossing of the receiver lines 11 results in a source 1 coinciding with a receiver 5. By treating the crossings of the source lines 12 in an similar manner, the standard bins 13 then contain 4 CMP's 10, which is a result of two CMP's being produced along each of the source and receiver line directions (2×2).

Figure 6C:
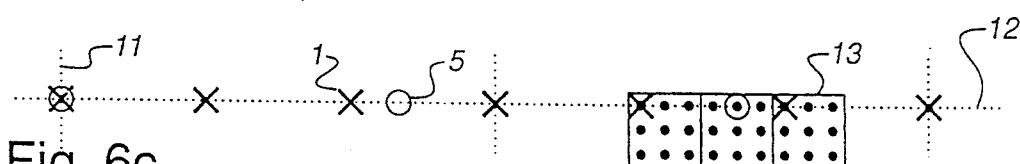
FIG. 6c illustrates the method of the invention in the case where only every third receiver line has a receiver coincident with a source, thereby creating 9 CMP's per standard bin.
Figure 6D:
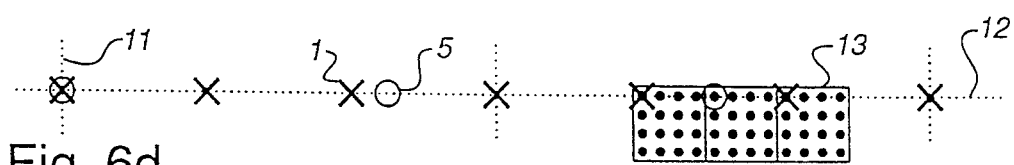
FIG. 6d illustrates the method of the invention in the case where only every fourth receiver line has a receiver coincident with a source, thereby creating 16 CMP's per standard bin.
Figure 6E:
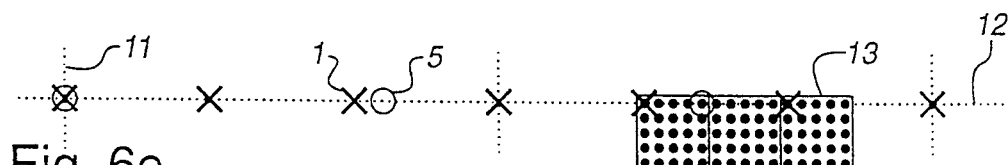
FIG. 6e illustrates the method of the invention in the case where only every fifth receiver line has a receiver coincident with a source, thereby creating 25 CMP's per standard bin.

FIGS. 6c, 6d and 6e present alternate arrangements of the present invention in which only every third, fourth and fifth crossing of the receiver lines 11 respectively causes a source 1 to coincide with a receiver 5. The resulting standard bins 13 contain 9, 16 and 25 CMP's 10 respectively.

Generally, as shown in FIGS. 6a to 6e, the geometry of the crossing receiving or source lines and the individually adjacent sources or receivers is only repeated at every second or greater crossing. Not only are a receiver and a source coincident at every second or greater crossing, but every adjacent receiver and source at consecutive line crossings also maintain a substantially identical relative offset which is repeated at each second or greater subsequent crossing. A coincident receiver and source at every second or greater crossing merely have a repeating relative offset of zero.

Figure 6F:
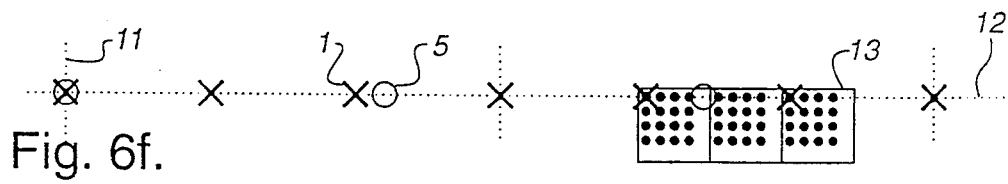
FIG. 6f presents the arrangement according to FIG. 6e except that only 16 folds were obtained from the patch, causing holes to occur in the pattern of CMP's ultimately produced.

To perform a seismic survey, a sufficient number of source and receiver lines 12, 11 need to be provided ensuring that enough reflecting pairs of source 1 and receivers 5 are available to create sufficient fold. FIG. 6f is illustrative of a situation where theoretically, 25 CMP's would be produced if sufficient reflection pairs were available. If in fact, only sixteen fold were achieved, then a lack of information, or "holes" would appear in the standard bins 13.

After the seismic survey for the patch 15 has been acquired, the patch is repetitively advanced to acquire data over areas greater than that immediately covered by the patch. The patch 15 is usually advanced an increment of distance equal to a multiple of the spacing between the lines 11 or 12 lying transverse to the direction of advancement. The patch 15 is advanced while still retaining an overlap with the previous location of the patch.

From the foregoing and using the method of the invention, it is now illustrated how one may optimize between obtaining an increased fold and a more detailed resolution.

Resolution refers to the precision with which information is known about an area which has been surveyed. The greater the number of sub-bins 14, the more detailed is the resolution, and the finer are the sub-surface features which may be discovered.

If the signal-to-noise ratio is acceptable, one can evaluate the information conveyed by each sub-bin 14 separately, resulting in a finer resolution than could be achieved using the prior art.

If the noise is unacceptably high, then portions (sub-bins 14) of adjacent standard bins 13 can be combined to produce larger bins of increased fold. The size of standard bins can be increased in incremental, moderate steps, one sub-bin at a time, until the S/N is acceptable. Typically, square standard bins 13 are re-sized into larger square bins.

If it is determined though, that a higher resolution is desirable or needed in only one direction, or in a direction oblique to the axes of the source and receiver lines 12, 11, then the sub-bins 14 can be optionally combined into rectangles oriented in the direction of interest.

The advantages of being able to effect the fold, or the resolution in the post-acquisition stage of a seismic survey, are best demonstrated in an actual example.

Example I, as follows, presents seismic data obtained from a site in southern Alberta, Canada.

EXAMPLE I

A sub-surface reservoir was surveyed. A conservative and readily available spacing SI, RI for the sources 1 and receivers 5 of 48 meters was chosen. This resulted in a standard bin 13 size of 24 by 24 meters. Three sub-bins ($S_R$) in the receiver line direction and 3 sub-bins ($S_S$) in the source line direction were chosen, producing 9 sub-bins 14 of 8×8 m each. The total number of receiver channels was 720. A roughly square patch 15 was developed using 12 receiver lines 11 of 60 receivers 5 each, totalling 720 stations. Using an integer n of 5, the receiver line spacing RLI was set to 224 meters calculated using 48×(5-⅓). The 12 receiver lines within the patch then encompassed (12-1)×224=2464 meters with each receiver line length being (60 -1)×48=2820 meters. The source line spacing SLI was similarly calculated as 448 meters, 48×(9+⅓), using an integer m of 9.

The ratio between the spacing of the receiver lines 11 and the source 1 is calculated at 224/48=4.67, yielding a remainder of 0.67 which is greater than zero and not an even multiple. The ratio between the spacing of the source lines 12 and the receiver 5 is also calculated at 224/48=4.67, yielding a remainder of 0.67.

Figure 7B:
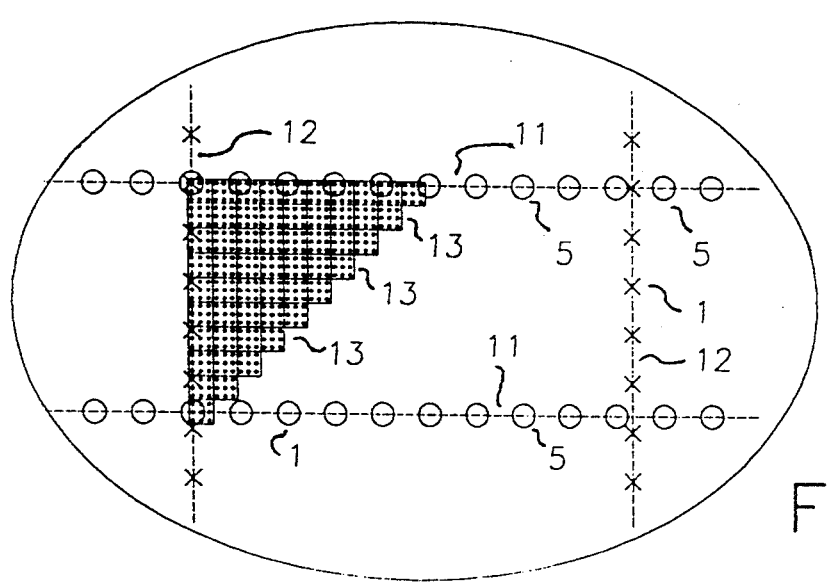

Having reference to FIG. 7a, the entire patch 15 of the example is featured with an expanded view of one portion (FIG. 7b). Every third line crossing A, B is seen to be coincident at a source 1 or a receiver 5 resulting in 9 sub-bins 14 per standard bin 13.

In this survey, a sub-surface sand formation feature 16 was located, in a 300 meter wide glauconite channel, which seemed to have promise as a pay zone. The sand feature 16 is located on FIGS. 14 through 18 as cross referenced by the glauconite channel width marker at the top, and at a sub-surface depth as marked by an arrow.

Figure 8A:
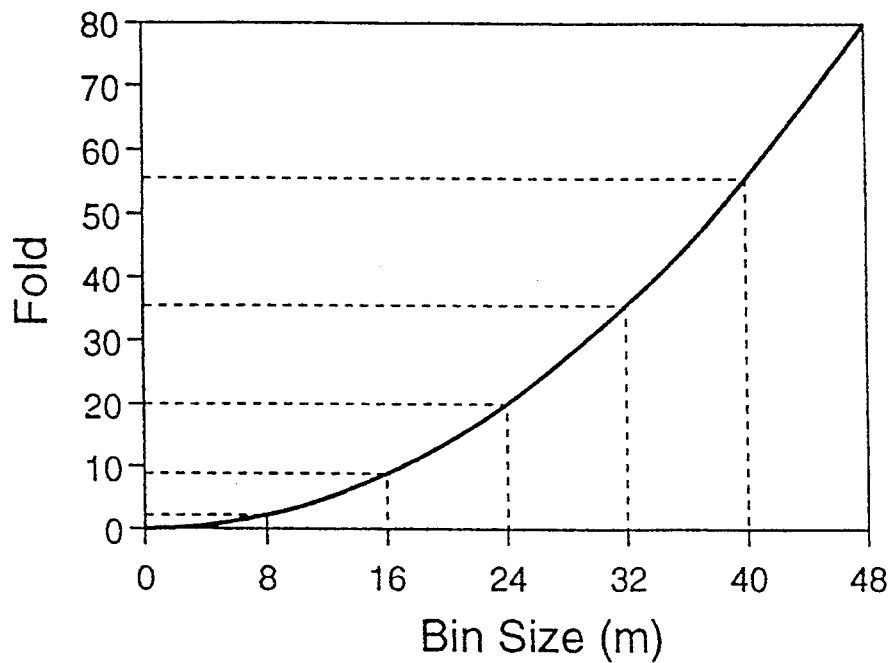
FIG. 8a is a graph which depicts the relationship of fold to bin size, particular to Example I.
Figure 8B:
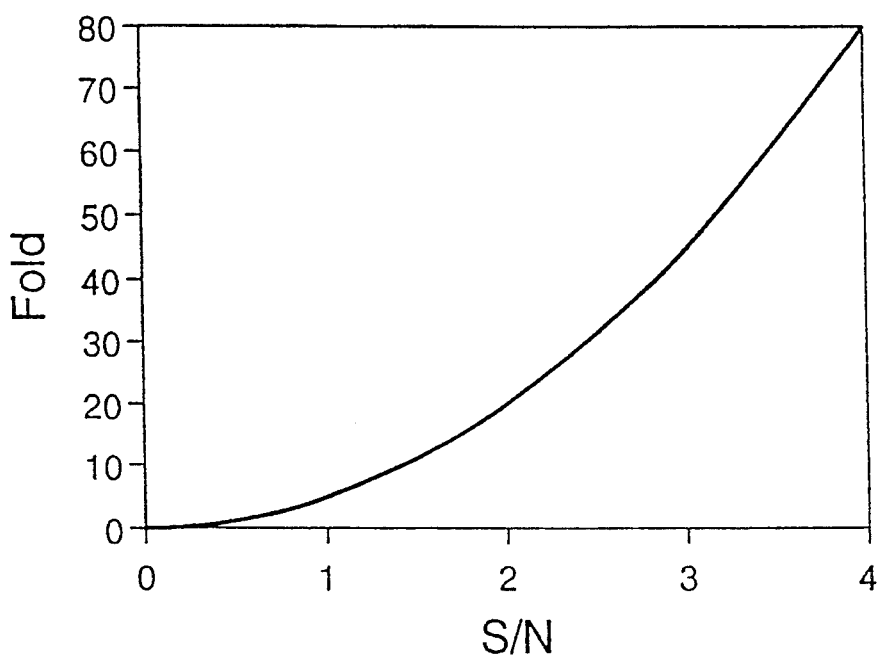
FIG. 8b is a graph which depicts the relationship of fold to S/N, particular to Example I.

The post-acquisition technique of re-binning involves adjusting the bin size to affect the fold and the signal-to-noise-ratio. Fold is related to a constant times the square of the bin size. FIG. 8a illustrates the squared relationship of size and fold for this example. Generally, the S/N ratio is a linear relationship with bin size. Therefore it follows that the fold can be calculated by multiplying a constant times the S/N squared as shown in FIG. 8b.

Having reference now to FIGS. 9 through 18, sub-bins are used to advantage to more clearly distinguish the sand feature 16.

Figure 14:
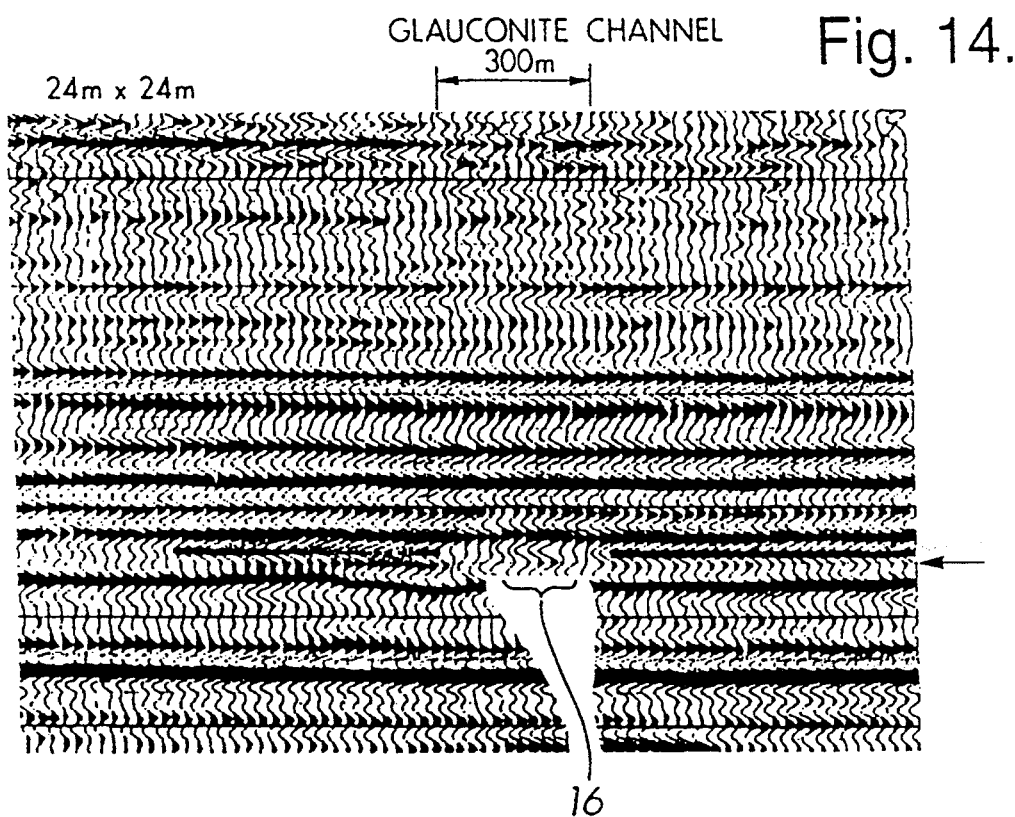
FIG. 14 illustrates the seismic traces resulting from the 24×24 m standard bins of FIG. 9.

Referring to FIG. 14, and using the original 24×24 m standard bins 13 FIGS. 7 and 9, then about 12 seismic traces (300 m/24 m) define the channel width. The fold achieved for this area was about 20 for the 24×24 m standard bins. Velocity information, as determined from the data for the 24×24 m standard bins was retained and used during the remaining post-acquisition, processing exercises.

The sand feature 16 can be tentatively identified by about 5 traces of heightened amplitude located at the center of the channel. The results of FIG. 14 are basically equivalent to that which would be obtained using the method of the prior art and are not generally considered as sufficient indication to initiate a drilling program.

Next, as viewed in FIG. 10, the 24×24 m standard bins 13 were re-sized to larger 32×32 m bins 17. The bin size was increased by over 30%. Using the fold/bin size constant of 0.035 (calculated from 20 fold at 24×24 m standard bin size) and FIG. 8a, the fold was seen to increase from 20 to about 35.

Figure 15:
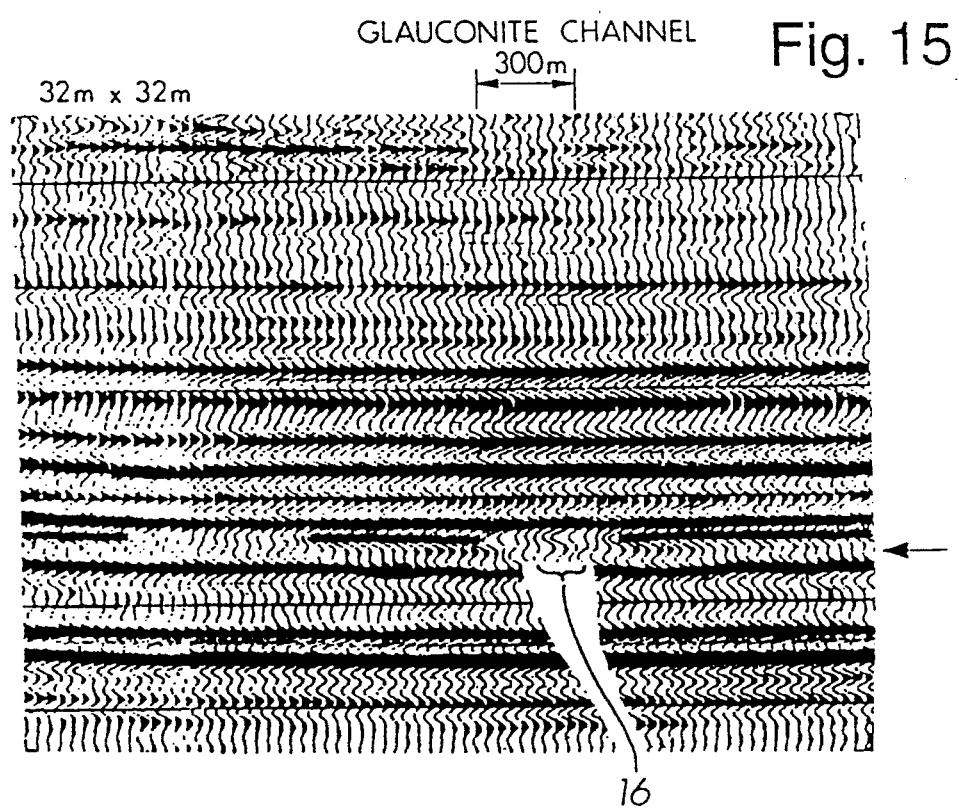
FIG. 15 illustrates the seismic traces resulting from the 32×32 m bins of FIG. 10.
Figure 16:
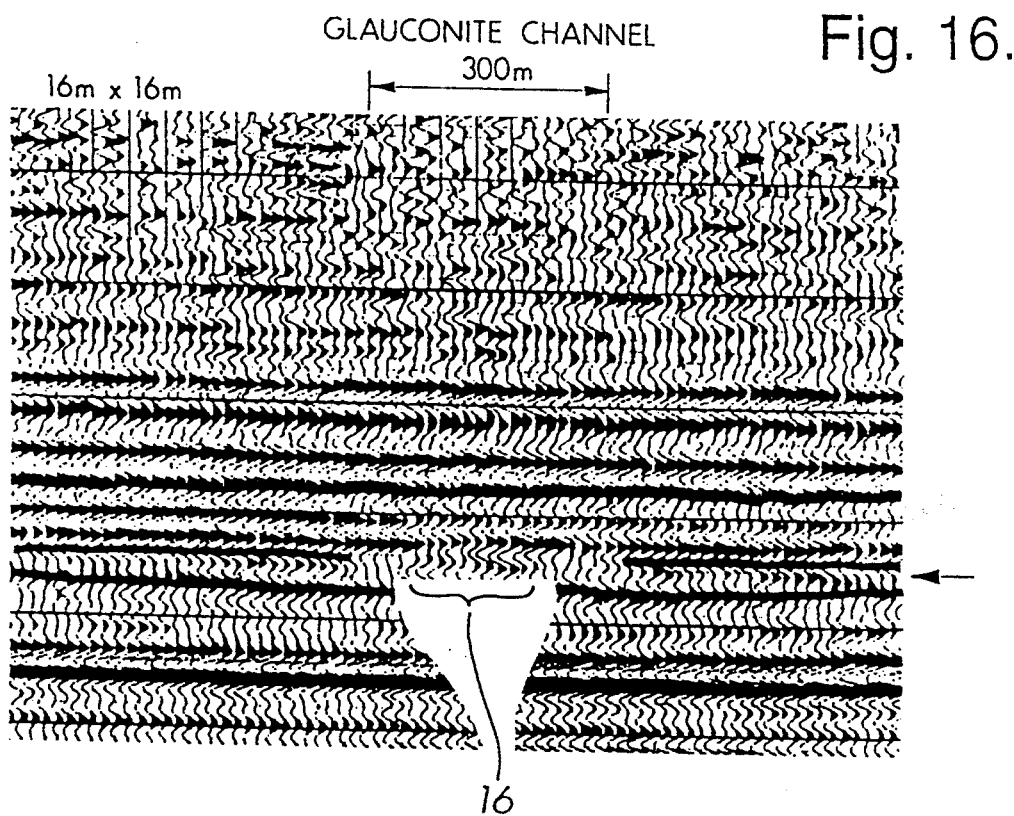
FIG. 16 illustrates the seismic traces resulting from the 16×16 m bins of FIG. 11.

As viewed on FIG. 15, although the trace data was less noisy, indication of the channel width was reduced to about 9 traces wide and the sand feature 16 to about 3 traces. This clearly illustrates the disadvantage to reducing the resolution, even when tempered by using sub-bins to only marginally increase the bin size. The prior art would have needed to double the standard bin size to 48×48 m, reducing the resolution of the channel width to 6 traces and the sand feature to only 1 or 2 traces.

As the data quality was actually quite good (S/N ratio acceptable), there was an opportunity to examine the data at higher resolution. As seen in FIG. 11, the 24×24 m standard bins 13 were re-sized to smaller 16×16 m bins 18. As viewed on FIG. 16, the glauconite channel was now defined by 18 traces (300 m/16 m) and the sand feature 16 by 8 traces. Referring to FIG. 8a, the fold was reduced to about 8. The data was visibly noisier, but not so great as to mask the sand feature 16. The resulting FIG. 16 bettered argued initiation of a drilling program.

Figure 17:
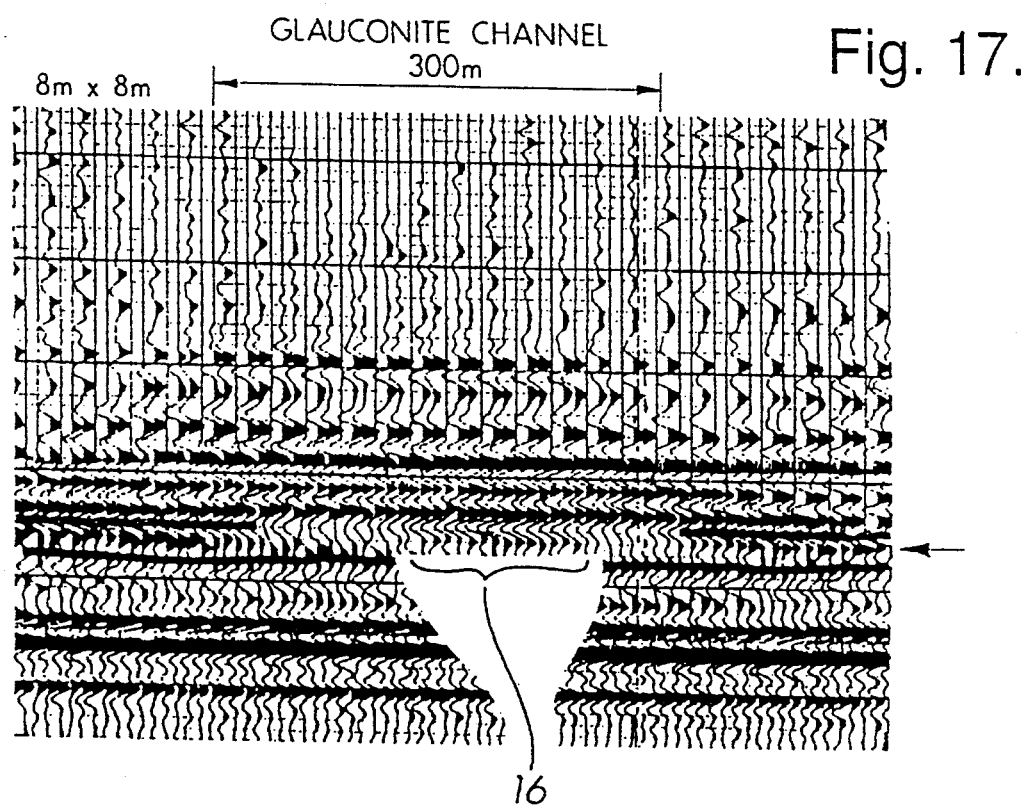
FIG. 17 illustrates the seismic traces resulting from the 8×8 m bins of FIG. 12.

FIGS. 12 and 17 present re-sizing of the standard bin 13 to 8×8 m bins 19, equal in size to one sub-bin 14. The fold was correspondingly reduced to about 2. The sand feature 16 is now defined by about 15 traces and is very distinct. It is believed that the data is still acceptable because the velocity determination had been made at the original 20 fold, 24×24 m standard bin size.

Figure 18:
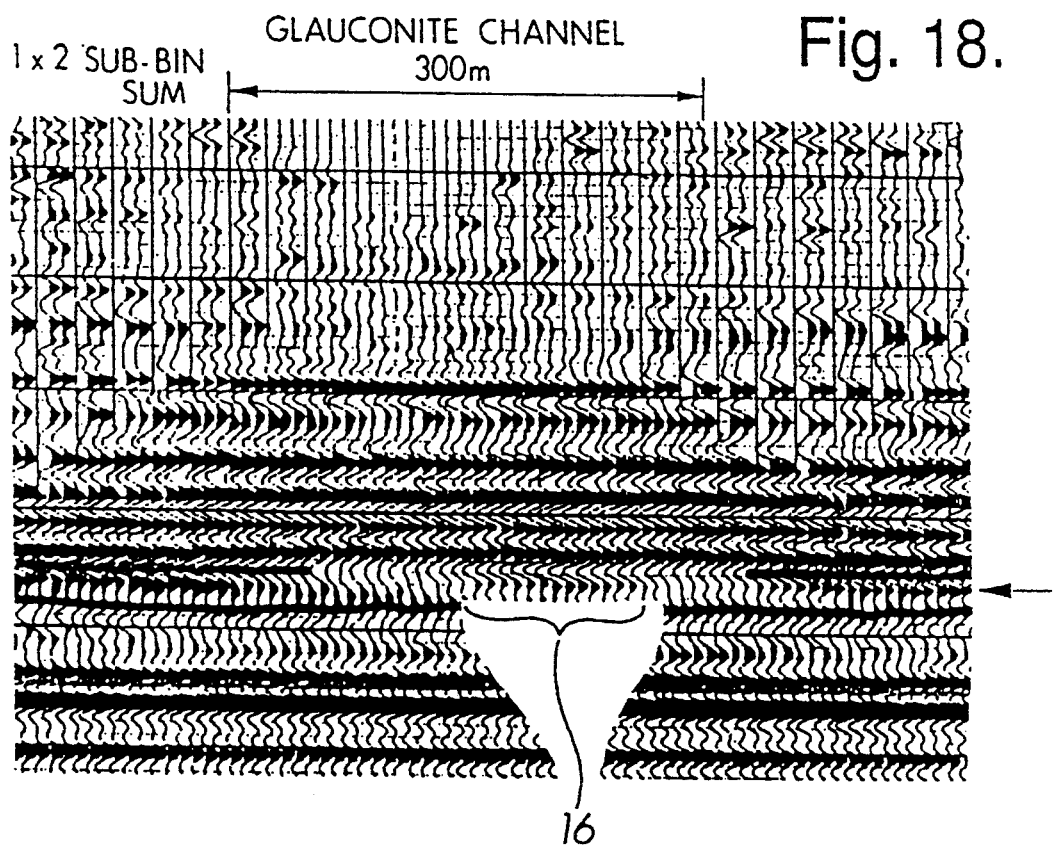
FIG. 18 illustrates the seismic traces resulting from the 1×2 sub-bin averaged 8×8 m bins of FIG. 13b.

Lastly, FIGS. 13a and 13b presents a data averaging technique using 8×8 m bins 19. Data from two adjacent sub-bins 20 was averaged to a single bin 21, and the averaging was advanced one sub-bin 14. This 1×2 sub-bin sum, running average, resulted in four fold data. The resultant FIG. 18 presents data having less noise than that for the direct 8×8 m bin 19 of FIG. 17.

In summary, as a result of the novel arrangement of sources and receivers, the invention is characterized by the following advantages:

the arrangements used to practice the method of the invention are geometrically simple and can be performed with the standard equipment of seismic crews;

the explorationist can optimize the survey data between the contrasting objectives of obtaining more detailed resolution and higher fold;

risks involved in guessing or anticipating the expected signal-to-noise ratio are significantly reduced, now having improved re-sizing options in the post-acquisition phase;

dependent upon the signal-to-noise ratio for the data, it is now possible to re-size a standard bin to a smaller size during processing, improving the resolution of the survey;

data which was particularly noisy can now be improved by re-sizing a standard bin to larger size using modest sized steps, allowing the fold to be increased without incurring staggering reductions in the resolution;

dependent upon the surface geometry, the explorationist now has the convenience of obtaining the same resolution by using either a close source and receiver spacing and adjusting the line crossings to produce a few sub-bins per standard bin, or a greater source and receiver spacing and adjusting the line crossings to produce a greater number of sub-bins per standard bin; and the explorationist can potentially secure cost savings by using fewer channels during the acquisition phase of the survey, without incurring significant risk, due to the relatively modest cost to re-process the data later with slightly larger bins.

The embodiment of the invention in which an exclusive property or privilege is claimed are defined as follows:

1. An improved method of three-dimensional seismic acquisition with respect to sub-surface acoustic impedance boundaries in the earth, comprising:
   (a) providing a plurality of equally spaced seismic energy sources in a linear array to form a source line;
   (b) providing a plurality of equally spaced seismic energy receivers in a linear array to form a receiver line;
   (c) repeating steps (a) and (b) to form a patch having the source lines substantially equally spaced and parallel and the receiver lines also substantially equally spaced and parallel with the source lines intersecting the receiver lines in a rectangular grid pattern, said pattern having a ratio of the spacing between the receiver lines and the spacing between sources which yields a remainder greater than zero and the ratio of the spacing between the source lines and the spacing between the receivers which also yields a remainder greater than zero, said source line spacing, said receiver line spacing, said source spacing and said receiver spacing being selected so that some of the sources and receivers are substantially coincident at selected intersections of the source and receiver lines said selected intersections being separated by from one to nine intersections of the source and receiver lines which are free from coincidence of the sources and receivers; and (d) initiating seismic disturbances from the sources and reflecting seismic energy from sub-surface acoustic impedance boundaries and receiving said seismic reflections at the receivers.

2. The method as recited in claim 1 comprising:
repeatedly advancing the patch an increment equal to a multiple of the spacing between receivers in the direction of advancement so that there is an overlap with the previous patch location.

* * * * *